US007565568B1

(12) United States Patent
Kumar et al.

(10) Patent No.: US 7,565,568 B1
(45) Date of Patent: Jul. 21, 2009

(54) METHOD AND SYSTEM FOR VIRTUALIZATION SWITCH FAILOVER

(75) Inventors: Mukul Kumar, Maharashtra (IN); Amitava Guha, San Jose, CA (US); Subhojit Roy, Maharashtra (IN); John J. Glen, Sunnyvale, CA (US)

(73) Assignee: Veritas Operating Corporation, Mountain View, CA (US)

( * ) Notice: Subject to any disclaimer, the term of this patent is extended or adjusted under 35 U.S.C. 154(b) by 695 days.

(21) Appl. No.: 10/788,698

(22) Filed: Feb. 27, 2004

(51) Int. Cl.
*G06F 11/00* (2006.01)
(52) U.S. Cl. .................. 714/5; 714/4; 714/6; 714/9; 714/11; 714/43
(58) Field of Classification Search ............... 714/4, 714/5, 6, 9, 11, 43
See application file for complete search history.

(56) References Cited

U.S. PATENT DOCUMENTS

| | | | |
|---|---|---|---|
| 6,578,158 B1 * | 6/2003 | Deitz et al. ............... 714/11 |
| 6,609,213 B1 * | 8/2003 | Nguyen et al. ............ 714/4 |
| 6,647,387 B1 | 11/2003 | McKean et al. ........... 707/9 |
| 6,883,065 B1 * | 4/2005 | Pittelkow et al. ......... 711/114 |
| 7,124,139 B2 * | 10/2006 | Nemoto et al. ........... 707/100 |
| 7,159,045 B2 * | 1/2007 | Maki et al. ............... 710/9 |
| 2002/0188711 A1 * | 12/2002 | Meyer et al. ............. 709/223 |
| 2003/0061220 A1 * | 3/2003 | Ibrahim et al. ........... 707/10 |
| 2004/0151188 A1 * | 8/2004 | Maveli et al. ............ 370/398 |

* cited by examiner

*Primary Examiner*—Robert Beausoliel
*Assistant Examiner*—Charles Ehne
(74) *Attorney, Agent, or Firm*—Campbell Stephenson LLP (57) ABSTRACT

A method and system for virtualization switch failover is disclosed. According one embodiment of the present invention, a failure of a first virtualization device within storage a area network interconnect and associated with a unique interconnect device identifier is detected and the unique interconnect device identifier is responsively associated with a second virtualization device of the storage area network interconnect.

27 Claims, 7 Drawing Sheets

METHOD AND SYSTEM FOR VIRTUALIZATION SWITCH FAILOVER

BACKGROUND OF THE INVENTION

1. Field of the Invention

The present invention relates to data storage and retrieval generally and more particularly to a method and system for virtualization switch failover.

2. Description of the Related Art

Information drives business. Companies today rely to an unprecedented extent on online, frequently accessed, constantly changing data to run their businesses. Unplanned events that inhibit the availability of this data can seriously damage business operations. Additionally, any permanent data loss, from natural disaster or any other source, will likely have serious negative consequences for the continued viability of a business. Therefore, when disaster strikes, companies must be prepared to eliminate or minimize data loss, and recover quickly with useable data.

Storage virtualization is one technique which is used to simplify the storage and provision of data from the perspective of application host data processing systems and users. Storage virtualization is the application of virtualization to storage services or devices for the purpose of aggregating, hiding complexity or adding new capabilities to lower level storage resources. Using storage virtualization, the internal function of a storage (sub) system(s) or service(s) are abstracted, hidden, or isolated from applications, application host data processing systems, or general network resources for the purpose of enabling application and network-independent management of storage or data. Storage can be virtualized simultaneously in multiple layers of a system, and storage virtualization may be provided at the application host, network interconnect, or storage device level.

Where storage virtualization is implemented with a storage area network (SAN), interconnect there is a one to one correspondence between each host target identifier (e.g., logical device name, virtual LUN, or the like) used by an application host and unique interconnect device identifier (e.g., a Fibre Channel world wide port name and/or world wide node name) used within the storage network interconnect. Consequently, failover between multiple interconnect elements or devices (e.g., switches) or paths may result in the alteration of the unique interconnect device identifier (ID) associated with a given host target identifier when an interconnect element or device becomes unavailable due to failure or disconnection.

Where storage virtualization is provided at the application host level, the unique interconnect device identifier to host target identifier mapping may be updated using existing storage virtualization facilities. Alternatively, (e.g., where storage virtualization is provided at the network interconnect level by one or more virtualization switches) specialized dynamic multipathing (DMP) facilities at each application host are used to failover from one interconnect element to another. Such DMP facilities may operate with multiple storage network interconnect connection points (e.g., host bus adapters, network interface cards, or the like) or a single connection point.

The use of DMP facilities for interconnect element failover suffers from number of drawbacks. Such DMP facilities increase the processing and storage burden already placed on application hosts and require data concerning specific storage device commands, failover procedures, or the like to be available at an application host in contradiction with the aims of network interconnect-based storage virtualization. Additionally, if the failover of a storage network interconnect element (and the resultant unique interconnect device identifier change) is visible to an application host, every application of that application host must be reconfigured to use a new host target identifier because of the one to one correspondence required between host target and unique interconnect device identifiers, thus causing additional application errors and/or processing delay.

SUMMARY OF THE INVENTION

Disclosed is a method and system for virtualization switch failover. According one embodiment of the present invention, a failure of a first virtualization device within storage a area network interconnect which is associated with a unique interconnect device identifier is detected and the unique interconnect device identifier is responsively associated with a second virtualization device of the storage area network interconnect.

Embodiments of the present invention may be used to seamlessly failover between storage area network interconnect elements from the perspective of an application host within the storage area network. By failing over the unique interconnect device identifier associated with an interconnect element, a host target identifier used by the application host may be maintained throughout a failover process.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous features and advantages made apparent to those skilled in the art by referencing the accompanying drawings in which.

The use of the same reference symbols in different drawings indicates similar or identical items.

DETAILED DESCRIPTION

In the following detailed description, numerous specific details such as specific method orders, structures, elements, and connections have been set forth. It is to be understood however that these and other specific details need not be utilized to practice embodiments of the present invention. In other circumstances, well-known structures, elements, or connections have been omitted, or have not been described in particular detail in order to avoid unnecessarily obscuring this description.

References within the specification to "one embodiment" or "an embodiment" are intended to indicate that a particular feature, structure, or characteristic described in connection with the embodiment is included in at least one embodiment of the present invention. The appearance of the phrase "in one embodiment" in various places within the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Figure 1A:
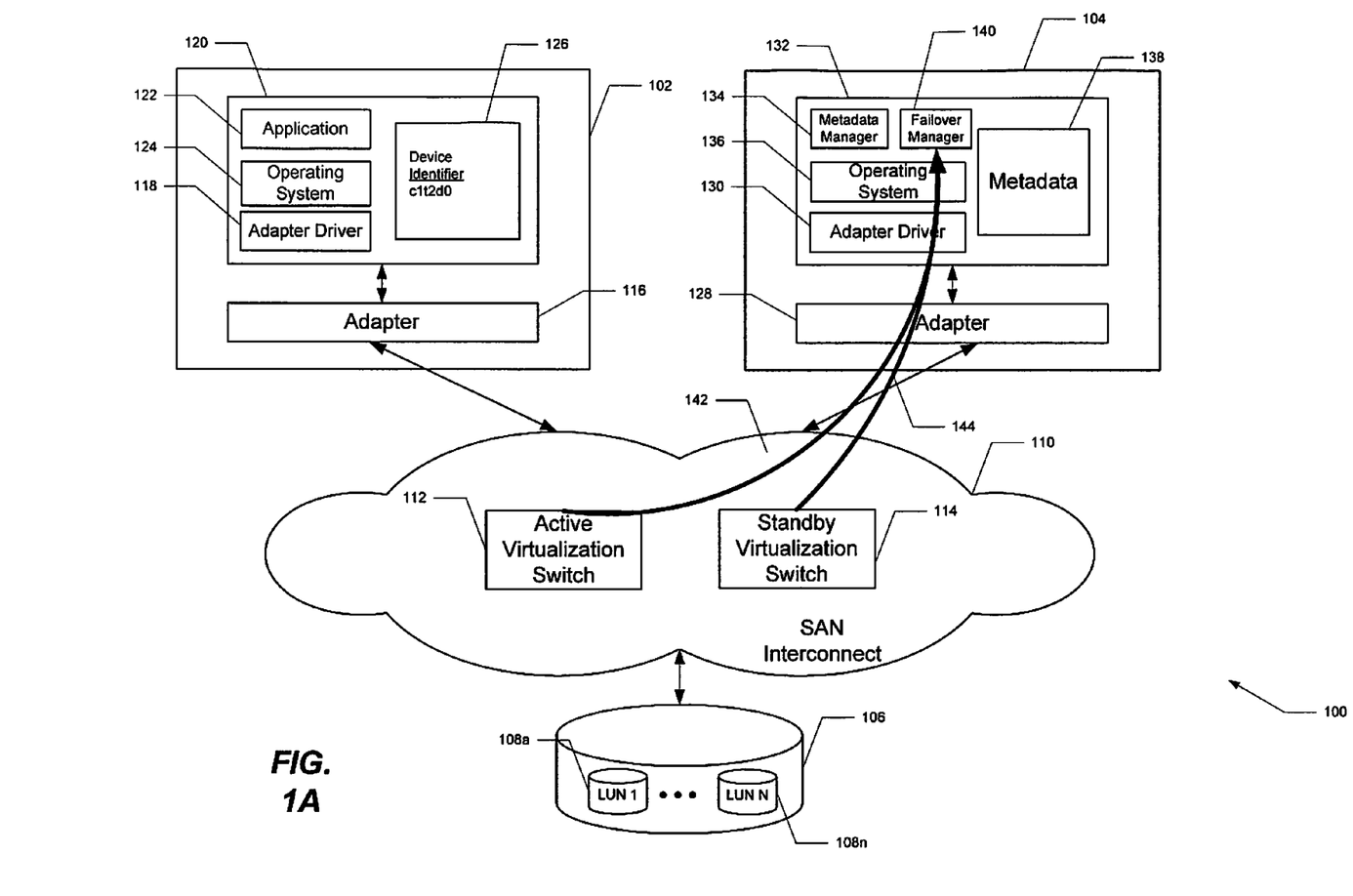
FIG. 1a illustrates a storage area network prior to the failover of a first virtualization device according to an embodiment of the present invention.

FIG. 1a illustrates a storage area network prior to the failover of a first virtualization device according to an embodiment of the present invention. Storage area network (SAN) 100 of the illustrated embodiment of FIG. 1a includes an application host 102 and a metadata host 104 coupled to a data storage device 106 (e.g., one or more disk storage arrays) including one or more storage elements 108a-108n (e.g., Logical Unit Numbers) via a SAN interconnect 110. A "host" within the present description may include any device or program that provides services to smaller or less capable device(s) or program(s) (e.g., a server computer system, appliance, or the like). SAN interconnect 110 of the illustrated embodiment includes a first virtualization device (active virtualization switch 112) and a second virtualization device (standby virtualization switch 114). While the terms "active" and "standby" have been used within the present description, it should be appreciated that the role or functionality of any of the described virtualization devices is not necessarily predetermined or assigned in various embodiments of the present invention. Consequently, a "standby" virtualization switch (e.g., standby virtualization switch 114) within the present description can be used to actively virtualize storage elements such as storage elements 108a-108n and export data volumes to one or more application hosts within SAN 100 prior to failover of an "active" virtualization switch (e.g., active virtualization switch 112).

A "virtualization device" within the present description includes any device configured to provide storage virtualization to one or more application hosts. Using the virtualization devices (active virtualization switch 112 and standby virtualization switch 114) of SAN interconnect 110 and the functionality of metadata host 104, a layer of abstraction is provided between application host 102 and data storage device 106 such that storage elements 108 may be used to present one or more virtual storage elements (e.g., virtual Logical Unit Numbers or "VLUNS") to application host 102. The virtual storage elements may be accessed by application host 102 using a single consistent interface (e.g., host target identifier).

Application host 102 of the illustrated embodiment of FIG. 1a includes an adapter 116 such as a host bus adapter (HBA), coupled to SAN interconnect 110. Adapter 116 is in turn functionally coupled to application host 102 via an adapter driver 118 stored within a memory 120 as shown. Memory 120 further includes an application 122 (e.g., a database management system) an operating system 124, and virtual storage element metadata 126 as shown. Virtual storage element metadata 126 of the illustrated embodiment includes one or more host target identifiers (e.g., logical device names, virtual LUNs, or the like).

Metadata host 104 of the illustrated embodiment of FIG. 1a similarly includes an adapter 128 coupled to SAN interconnect 110 and functionally coupled to metadata host 104 via an adapter driver 130 stored within a memory 132 as shown. Memory 132 further includes a metadata manager 134, an operating system 136, metadata 138, and a failover manager 140 according to an embodiment of the present invention. Using metadata manager 134, metadata host 104 is responsible for managing and maintaining metadata within SAN 100. Metadata manager receives and services requests relating to storage metadata (e.g., volume metadata, Fibre Channel metadata, SCSI metadata, or the like) such as metadata 138 (e.g., requests to create, delete, extend, truncate, and/or move files).

According to one embodiment of the present invention, metadata manager 134 is configured to determine a mapping between a host target identifier and a unique interconnect device identifier using at least a portion of metadata 138. Prior to failover, failover manager 140 operates to detect a failure of an active virtualization switch (e.g., active virtualization switch 112) by monitoring status using one or more heartbeat signals such as heartbeat signal 142. In the illustrated embodiment, the status of one or more standby virtualization switches (e.g., standby virtualization switch 114) may be similarly monitored using heartbeat signals such as heartbeat signal 144. While a single standby virtualization switch 114 has been illustrated herein, in alternative embodiments of the present invention additional standby virtualization switches may be provided.

Figure 1B:
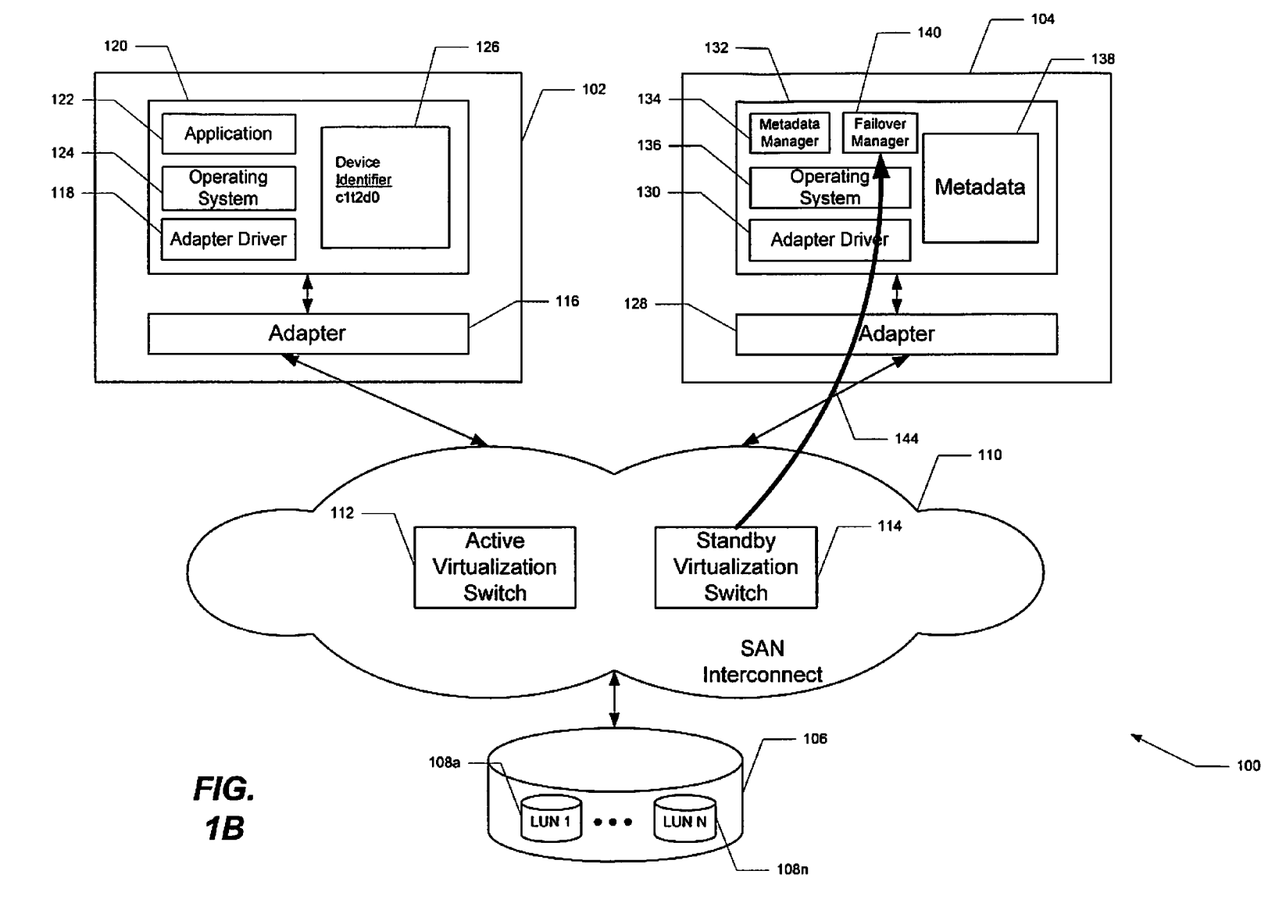
FIG. 1b illustrates a storage area network following failover of a first virtualization device according to an embodiment of the present invention.

FIG. 1b illustrates a storage area network following failover of a first virtualization device according to an embodiment of the present invention. As described herein with respect to FIG. 1a, SAN 100 includes application host 102 and metadata host 104 coupled to data storage device 106 including one or more storage elements 108a-108n via SAN interconnect 110. A failure of active virtualization switch 112 of SAN interconnect 110 is indicated by the absence of heartbeat signal 142 as monitored by failover manager 140. According to one embodiment, failover manager 140 operates to associate a unique interconnect device identifier of active virtualization switch 112 with standby virtualization switch 114 following the detection of a failure of active virtualization switch 112 by manipulating metadata 138. Consequently, each virtual storage element visible to application host 102 remains associated with the same host target identifier before, during, and following failover such that failover appears seamless from the perspective of application host 102.

Figure 2A:
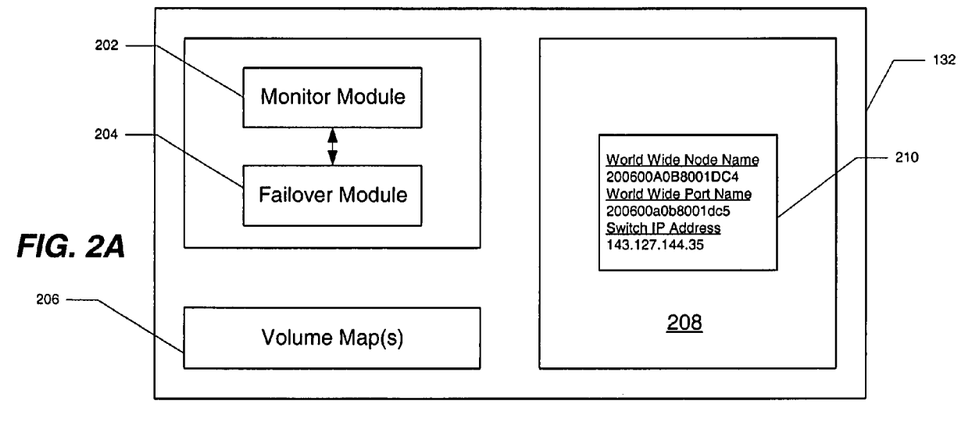
FIG. 2a illustrates a block diagram of a metadata host such as that illustrated in FIGS. 1a and 1b prior to the failover of a first virtualization device according to an embodiment of the present invention.

FIG. 2a illustrates a block diagram of a metadata host such as that illustrated in FIGS. 1a and 1b prior to the failover of a first virtualization device according to an embodiment of the present invention. More specifically, FIG. 2a illustrates the contents of memory 132 of metadata host 104. Metadata (e.g., metadata 138) within memory 132 includes a metadata database 208 including a database entry 210 and further includes one or more volume map(s) 206 each specifying a mapping between a host target ID (e.g., a logical device name, virtual LUN, or the like) and one or more physical storage device identifiers.

Database entry 210 of the illustrated embodiment includes data specifying a unique interconnect device identifier such as a Fibre Channel world wide port name and/or world wide node name, and a switch Internet Protocol (IP) address of a virtualization switch (e.g., active virtualization switch 112), thereby associating the virtualization switch and described unique interconnect device identifier. In one embodiment of the present invention database entry 210 further includes additional metadata used to determine a mapping between a host target identifier and a unique interconnect device identifier. In another embodiment, database entry 210 further includes additional metadata uniquely identifying a virtualization switch device.

In the illustrated embodiment, failover manager 140 within memory 132 includes a monitor module 202 subcomponent and a failover module 204 subcomponent. Monitor module 202 receives a heartbeat signal from each virtualization switch (e.g., virtualization switches 112 and 114) of a SAN and indicates, in response to the absence of an expected heartbeat signal, a failure condition for a corresponding virtualization switch to failover module 204. Failover module 204, upon receiving an indication that a virtualization switch has failed, associates the failed virtualization switch's unique interconnect device identifier with a standby virtualization switch, provides the standby virtualization switch with the failed virtualization switch's volume map, and exports all virtual storage elements associated with the standby virtualization switch to the SAN.

Figure 2B:
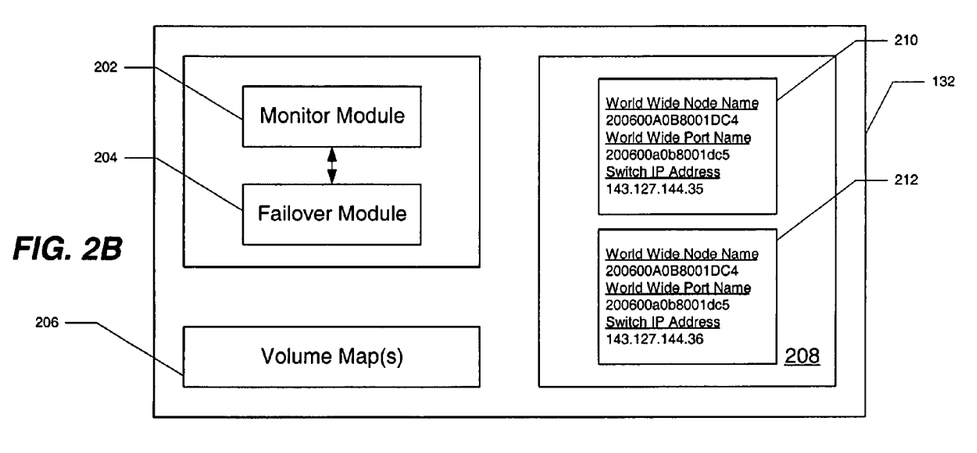
FIG. 2b illustrates a block diagram of a metadata host such as that illustrated in FIGS. 1a and 1b following the failover of a first virtualization device according to an embodiment of the present invention.

FIG. 2b illustrates a block diagram of a metadata host such as that illustrated in FIGS. 1a and 1b following the failover of a first virtualization device according to an embodiment of the present invention. More specifically, FIG. 2b illustrates the contents of memory 132 of metadata host 104. Following receipt of an indication or notification of virtualization switch failure as described herein, failover module 204 associates the failed virtualization switch's unique interconnect device identifier with a standby virtualization switch by creating an additional database entry (e.g., database entry 212) as shown. Database entry 212 of the illustrated embodiment includes data specifying the unique interconnect device identifier (e.g., Fibre Channel world wide port and/or node name) and a switch Internet Protocol (IP) address of a standby virtualization switch (e.g., standby virtualization switch 114), thereby associating the standby virtualization switch and described unique interconnect device identifier.

Figure 3:
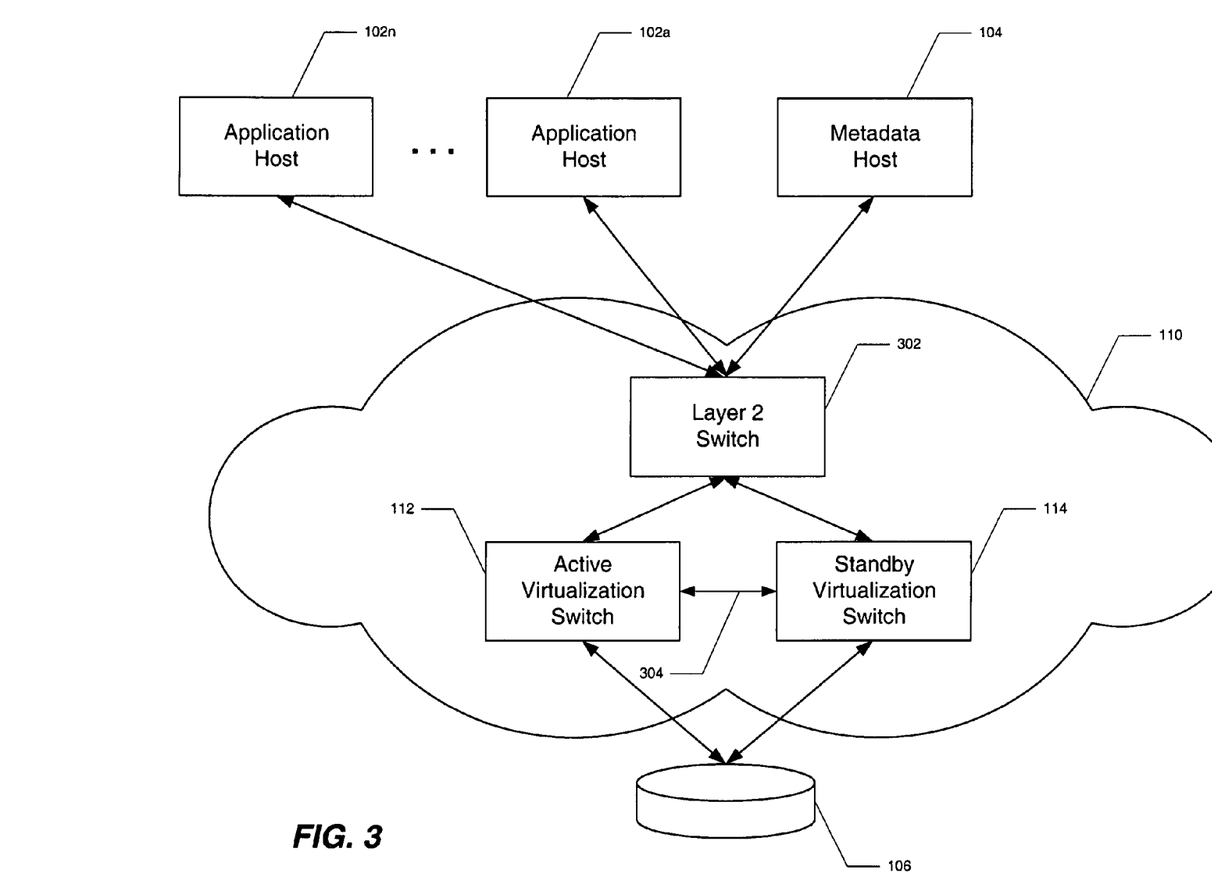
FIG. 3 illustrates a storage area network useable with one or more embodiments of the present invention.

FIG. 3 illustrates a storage area network useable with one or more embodiments of the present invention. In the illustrated embodiment, storage area network interconnect 110 includes, in addition to active virtualization switch 112 and standby virtualization switch 114 as described previously herein, a layer two switch 302 (e.g., an Ethernet switch, Fibre Channel Switch, ATM switch, or the like) which serves as a central connection point to couple one or more application host(s) 102a . . . 102n and metadata host 104 to data storage device(s) 106. Although a single layer two switch 302 has been illustrated in the embodiment of FIG. 3, in alternative embodiments of the present invention, application host(s) 102 and metadata host 104 may be coupled to separate layer two switches. According to one embodiment, active virtualization switch 112 and standby virtualization switch 114 are Fibre Channel switches including no inter-switch ports (e.g., E_Ports).

In operation, layer two switch 302 receives input/output requests from application host(s) 102 and responsively provides such requests to an appropriate one of active virtualization switch 112 and standby virtualization switch 114 based upon metadata obtained from metadata host 104. According to one embodiment of the present invention, layer two switch 302 receives an input/output request including data identifying a virtual storage element (e.g., a virtual target and virtual LUN) using a host target identifier and provides the received input/output request to an appropriate one of active virtualization switch 112 and standby virtualization switch 114 based upon data previously retrieved from metadata host 104 which specifies a mapping of the received host target identifier to a unique interconnect device identifier (e.g., a Fibre Channel world wide port name and/or world wide node name).

According to the illustrated embodiment of FIG. 3, metadata (e.g., one or more volume maps, LUNs, or the like) used to provide storage virtualization is transmitted between active virtualization switch 112 and standby virtualization switch 114 prior to the failover from active virtualization switch 112 using a communications link 304. Such data transfer may be performed synchronously between active virtualization switch 112 and standby virtualization switch 114 or asynchronously such that the amount of metadata transferred to standby virtualization switch 114 at failover is reduced. According to another embodiment of the present invention, all metadata necessary to provide storage virtualization at standby virtualization switch 114 is transferred from metadata host 104 to standby virtualization switch 114 at failover.

In another embodiment of the present invention, a metadata host (e.g., metadata host 104) is not utilized to perform failover between active virtualization switch 112 and standby virtualization switch 114. In the described embodiment, communications link 304 is used by standby virtualization switch 114 to detect the failure of active virtualization switch 112 (e.g., by monitoring communications link 304 for the transmission of a heartbeat signal from active virtualization switch 112). Failover to standby virtualization switch 114 may then be performed using a failover manager (not illustrated) resident within standby virtualization switch 114. In other embodiments of the present invention, failure detection may be performed by one of metadata host 104 and standby virtualization switch 114 with failover (e.g., the association of a unique interconnect device identifier with a standby virtualization switch) being performed by another of metadata host 104 and standby virtualization switch 114.

Figure 4:
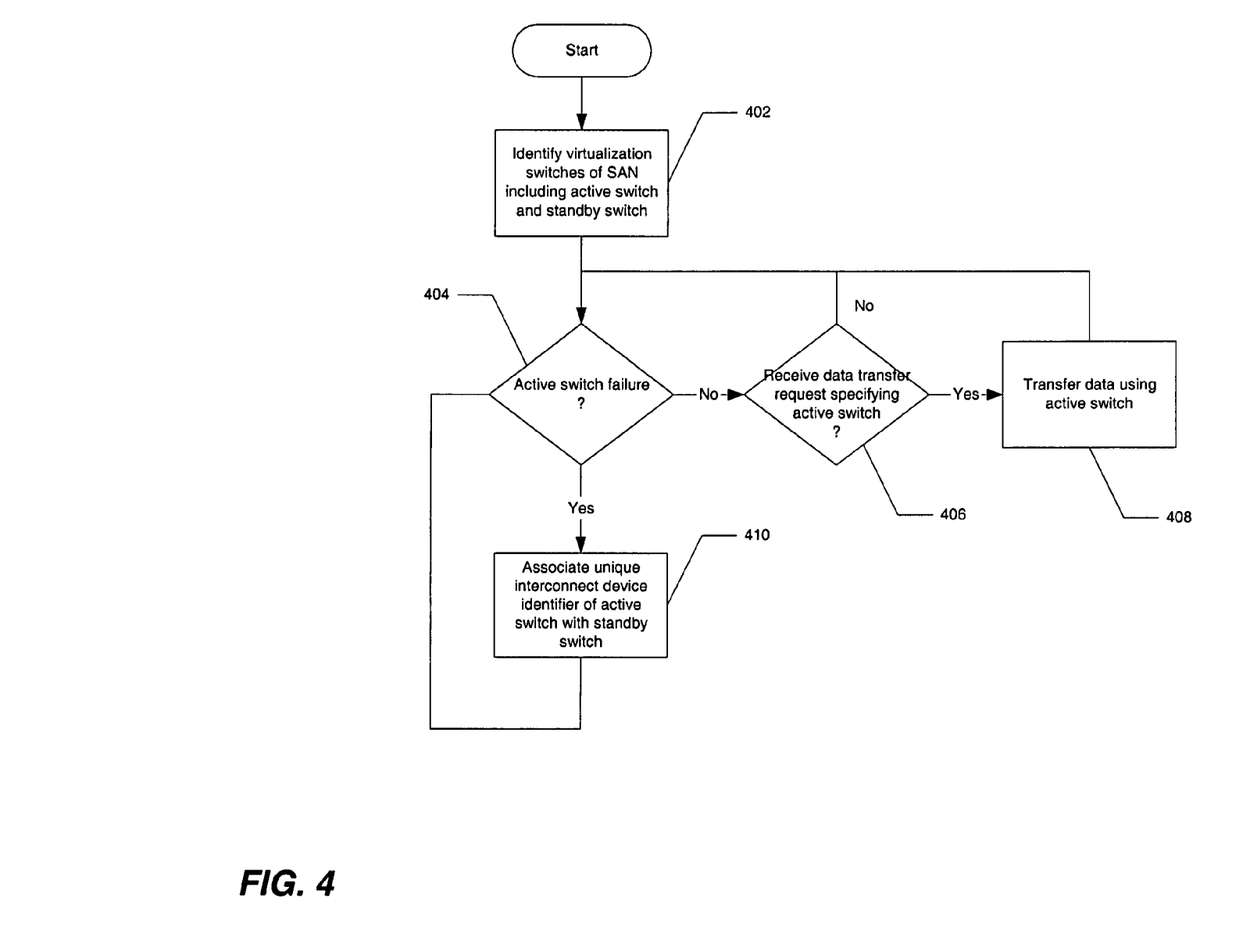
FIG. 4 illustrates a process flow diagram of a storage area network interconnect operation process according to an embodiment of the present invention.

FIG. 4 illustrates a process flow diagram of a storage area network interconnect operation process according to an embodiment of the present invention. In the illustrated process embodiment all virtualization switches of a storage area network are initially identified including an active virtualization switch and a standby virtualization switch (e.g., active virtualization switch 112 and standby virtualization switch 114 previously described herein) (process block 402). Once the virtualization switches have been identified, the active virtualization switch is monitored to detect failure (e.g., hardware or software failure of the switch, its disconnection for service or upgrade, or the like) (process block 404). In alternative embodiments of the present invention, the described active virtualization switch monitoring may be performed using any of a number of techniques (e.g., polling, heartbeat signal monitoring, or the like).

Following a determination failure of the active virtualization switch has not occurred, data transfer requests including data specifying the active virtualization switch (e.g., a host target identifier corresponding to the active virtualization switch) may be received (process block 406). Once a data transfer request including data specifying the active virtualization switch is received, data is transferred from an associated storage device using the active virtualization switch (process block 408). Otherwise, monitoring for active virtualization switch failure continues until a data transfer request is received. Upon the detection of an active virtualization switch failure, a unique interconnect device identifier (e.g., a Fibre Channel world wide port name and/or world wide node name) associated with the active virtualization switch is associated with a standby virtualization switch (process block 410) as further described herein.

Figure 5:
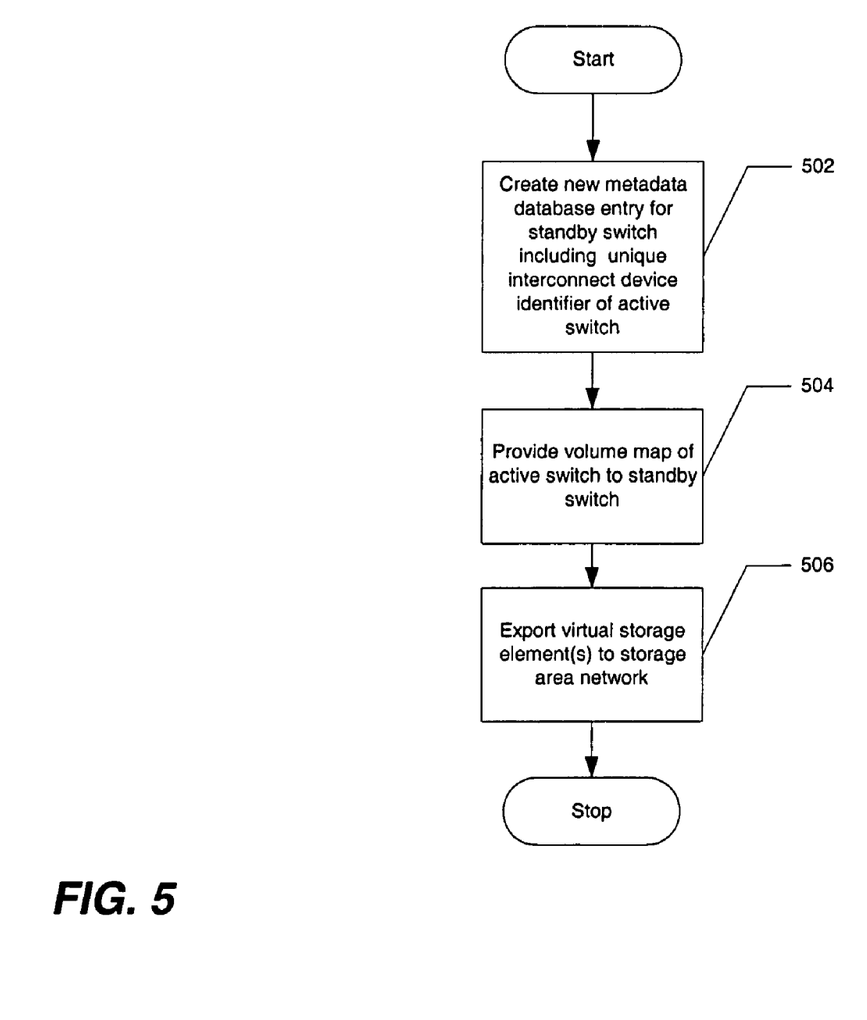
FIG. 5 illustrates a process flow diagram of a failover process according to an embodiment of the present invention.

FIG. 5 illustrates a process flow diagram of a failover process according to an embodiment of the present invention. More specifically, the process flow diagram of FIG. 5 depicts the association of an active virtualization switch's unique interconnect device identifier with a standby virtualization switch following active virtualization switch failure. In the illustrated process embodiment, a new database entry is created for a standby virtualization switch within a metadata database as described herein which includes a unique interconnect device identifier associated with the active virtualization switch (process block 502). Thereafter, a volume map or other data structure specifying a mapping between virtual storage elements and storage devices (e.g., physical disk, tape or solid state storage devices) associated with the active virtualization switch is provided to the standby virtualization switch (process block 504). Alternatively, as previously described herein, this volume map provision may be performed prior to the detection of a failover condition at the active virtualization switch. Once the volume map has been provided to the standby virtualization switch, any virtual storage elements associated with the standby virtualization switch are "exported" (process block 506) such that they are visible to the elements of the storage area network. According to one embodiment, the described export operation includes the transmission of a message to all elements of the storage area network including a notification of the associated virtual storage element(s) availability.

Those having ordinary skill in the art will readily recognize that the techniques and methods discussed below can be implemented in software using a variety of computer languages, including, for example, traditional computer languages such as assembly language, Pascal, and C; object oriented languages such as C++ and Java; and scripting languages such as Shell, Perl and Tcl/Tk. Failover manager 140 can be provided to the data processing system via a variety of machine-readable media including electronic media (e.g., flash memory), magnetic storage media (e.g., hard disk 658, a floppy disk, etc.), optical storage media (e.g., CD-ROM 660), and communications media conveying signals encoding the instructions (e.g., via a network coupled to network interface 654).

Figure 6:
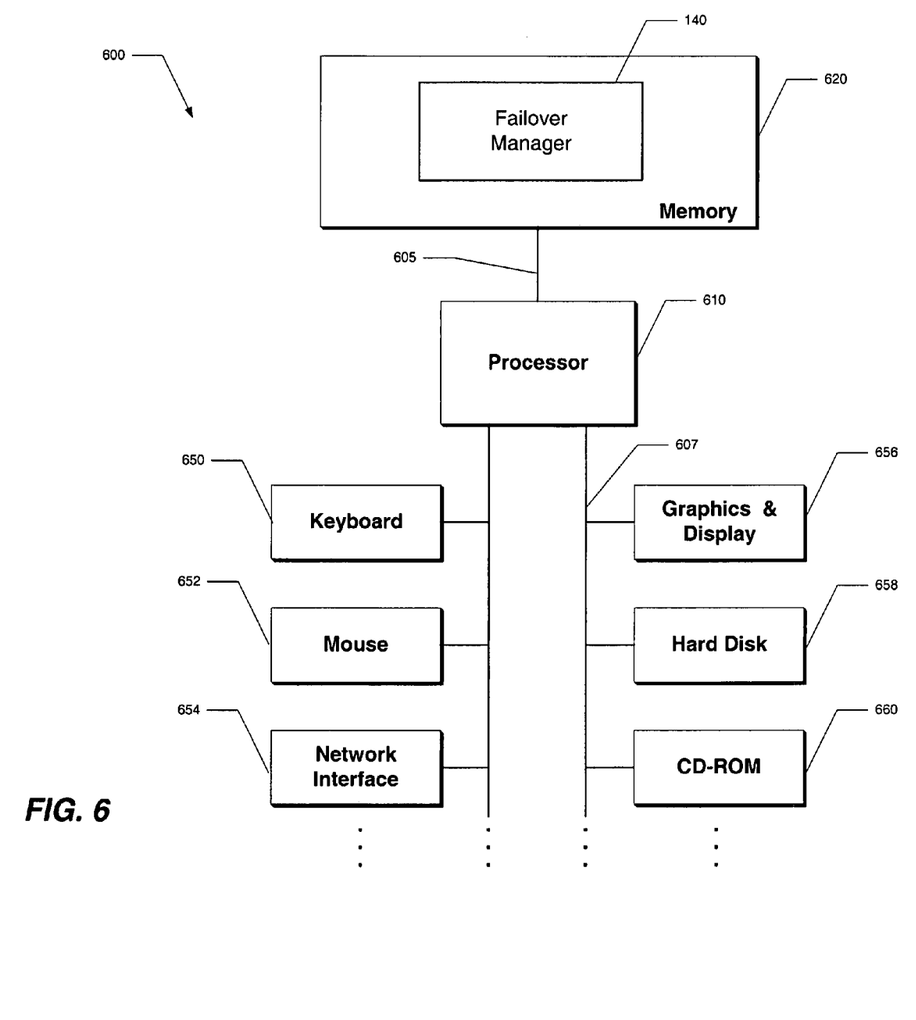
FIG. 6 illustrates a data processing system useable with one or more embodiments of the present invention.

FIG. 6 illustrates a data processing system useable with one or more embodiments of the present invention. Data processing system 600 can be used, for example, to implement one or more nodes of a larger data processing system. Data processing system 600 of the illustrated embodiment includes a processor 610 and a memory 620 coupled together by communications bus 605. Processor 610 can be a single processor or a number of individual processors working together. Memory 620 is typically random access memory (RAM), or some other dynamic storage device, and is capable of storing instructions to be executed by the processor(s), e.g., failover manager 140. Memory 620 is also used for storing temporary variables or other intermediate data during the execution of instructions by processor 610.

Data processing system 600 of the illustrated also includes devices such as keyboard 650, and mouse 652, network interface 654, graphics & display 656, hard disk 658, and CD-ROM 660, all of which are coupled to processor 610 by communications bus 607. It will be apparent to those having ordinary skill in the art that data processing system 600 can also include numerous elements not shown in the figure, such as additional storage devices, communications devices, input devices, and output devices, as illustrated by the ellipsis shown. According to one alternative embodiment of the present invention, such an additional data processing system device comprises a Fibre Channel interface.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
   detecting a failure of a first virtualization device of a storage area network interconnect, wherein
   said storage area network interconnect is coupled to a metadata host,
   said metadata host is configured to maintain metadata associated with said
   first virtualization device, said metadata host is configured to monitor a heartbeat signal from a plurality of virtualization devices, and
   said first virtualization device is associated with a unique interconnect device identifier, wherein
   the unique interconnect device identifier identifies a virtualization device with which the unique interconnect device identifier is associated, and
   the unique interconnect device identifier is configured to identify the virtualization device as a target of a data transfer request; and
   associating said unique interconnect device identifier with a second virtualization device of said storage area network interconnect in response to said detecting, wherein said associating comprises modifying said metadata.

2. The method of claim 1 wherein
   said storage area network interconnect is coupled to an application host and to a storage device,
   said first virtualization device is configured to present a virtual storage element to said application host using a host device identifier, and
   said virtual storage element comprises at least a portion of said storage device.

3. The method of claim 2 wherein
   said second virtualization device is configured to present said virtual storage element to said application host using said host device identifier in response to said associating; and
   said second virtualization device is selected from a plurality of virtualization devices.

4. The method of claim 3 wherein said monitoring comprises:
   monitoring a communications link for a heartbeat signal from said first virtualization device via a failover manager.

5. The method of claim 4 wherein
   said modifying comprises generating a metadata entry corresponding to said second virtualization device, and
   said metadata entry comprises said unique interconnect device identifier.

6. The method of claim 3 further comprising:
   storing a volume map at said second virtualization device in response to said detecting, wherein said volume map is provided by said metadata host.

7. The method of claim 3 wherein said unique interconnect device identifier comprises a Fibre Channel device identifier.

8. The method of claim 3 wherein said unique interconnect device identifier comprises at least one of a world wide node name and a world wide port name.

9. The method of claim 3 wherein
said first virtualization device comprises a first virtualization switch, and
said second virtualization device comprises a second virtualization switch.

10. A machine-readable medium storing a plurality of instructions executable by a machine embodied therein, wherein said plurality of instructions when executed cause said machine to perform a method comprising:
detecting a failure of a first virtualization device of a storage area network interconnect, wherein
said storage area network interconnect is coupled to a metadata host,
said metadata host is configured to maintain metadata associated with said first virtualization device, said metadata host is configured to monitor a heartbeat signal from a plurality of virtualization devices, and
said first virtualization device is associated with a unique interconnect device identifier, wherein
the unique interconnect device identifier identifies a virtualization device with which the unique interconnect device identifier is associated, and
the unique interconnect device identifier is configured to identify the virtualization device as a target of a data transfer request, and
associating said unique interconnect device identifier with a second virtualization device of said storage area network interconnect in response to said detecting, wherein said associating comprises modifying said metadata.

11. The machine-readable medium storing a plurality of instructions executable by a machine embodied therein of claim 10 wherein
said storage area network interconnect is coupled to an application host and to a storage device,
said first virtualization device is configured to present a virtual storage element to said application host using a host device identifier, and
said virtual storage element comprises at least a portion of said storage device.

12. The machine-readable medium storing a plurality of instructions executable by a machine embodied therein of claim 11 wherein
said second virtualization device is configured to present said virtual storage element to said application host using said host device identifier in response to said associating.

13. The machine-readable medium storing a plurality of instructions executable by a machine embodied therein of claim 12 wherein said monitoring comprises:
monitoring a communications link for a heartbeat signal from said first virtualization device.

14. The machine-readable medium storing a plurality of instructions executable by a machine embodied therein of claim 13 wherein
said modifying comprises generating a metadata entry corresponding to said second virtualization device, and
said metadata entry comprises said unique interconnect device identifier.

15. The machine-readable medium storing a plurality of instructions executable by a machine embodied therein of claim 12, said method further comprising:
storing a volume map at said second virtualization device in response to said detecting, wherein said volume map is provided by said metadata host.

16. The machine-readable medium storing a plurality of instructions executable by a machine embodied therein of claim 12 wherein said unique interconnect device identifier comprises a Fibre Channel device identifier.

17. The machine-readable medium storing a plurality of instructions executable by a machine embodied therein of claim 12 wherein said unique interconnect device identifier comprises at least one of a world wide node name and a world wide port name.

18. The machine-readable medium storing a plurality of instructions executable by a machine embodied therein of claim 12 wherein
said first virtualization device comprises a first virtualization switch, and
said second virtualization device comprises a second virtualization switch.

19. A data processing system comprising:
means for detecting a failure of a first virtualization device of a storage area network interconnect, wherein
said first virtualization device is associated with a unique interconnect device identifier, wherein
the unique interconnect device identifier identifies a virtualization device with which the unique interconnect device identifier is associated, and
the unique interconnect device identifier is configured to identify the virtualization device as a target of a data transfer request,
said storage area network interconnect is coupled to an application host, a metadata host, and to a storage device,
said metadata host is configured to maintain metadata associated with a virtual storage element,
said metadata host is configured to monitor a heartbeat signal from a plurality of virtualization devices,
said first virtualization device is configured to present said virtual storage element to said application host using a host device identifier, and
said virtual storage element comprises at least a portion of said storage device; and
means for associating said unique interconnect device identifier with a second virtualization device of said storage area network interconnect coupled to said means for detecting, wherein said associating comprises modifying said metadata.

20. The data processing system of claim 19 wherein
said second virtualization device is configured to present said virtual storage element to said application host using said host device identifier in response to said associating.

21. The data processing system of claim 20 wherein said means for detecting comprises:
means for monitoring a communications link for a heartbeat signal from said first virtualization device.

22. The data processing system of claim 20 wherein said unique interconnect device identifier comprises a Fibre Channel device identifier.

23. The data processing system of claim 20 wherein said unique interconnect device identifier comprises at least one of a world wide node name and a world wide port name.

24. The data processing system of claim 20 wherein
said first virtualization device comprises a first virtualization switch, and
said second virtualization device comprises a second virtualization switch.

25. A data processing system comprising:

a metadata host, wherein the metadata host comprises:

- a monitor module to monitor a communications link for a heartbeat signal from a first virtualization device of a storage area network interconnect,
- wherein said first virtualization device is associated with a unique interconnect device identifier, wherein
- the unique interconnect device identifier identifies a virtualization device with which the unique interconnect device identifier is associated, and
- the unique interconnect device identifier is configured to identify the virtualization device as a target of a data transfer request; and
- a failover module coupled to said monitor module to detect a failure of said first virtualization device and to associate said unique interconnect device identifier with a second virtualization device of said storage area network interconnect in response to said detecting.

26. The data processing system of claim 25 wherein said storage area network interconnect is coupled to an application host and to a storage device, said first virtualization device is configured to present a virtual storage element to said application host using a host device identifier, and said virtual storage element comprises at least a portion of said storage device.

27. The data processing system of claim 26 wherein said second virtualization device is configured to present said virtual storage element to said application host using said host device identifier following a failure of said first virtualization device.

* * * * *

UNITED STATES PATENT AND TRADEMARK OFFICE
CERTIFICATE OF CORRECTION

| | | |
|---|---|---|
| PATENT NO. | : 7,565,568 B1 | Page 1 of 1 |
| APPLICATION NO. | : 10/788698 | |
| DATED | : July 21, 2009 | |
| INVENTOR(S) | : Mukul Kumar et al. | |

It is certified that error appears in the above-identified patent and that said Letters Patent is hereby corrected as shown below:

On the Title Page at (73) please correct the Assignee name to read as follows:

Assignee:    Symantec Operating Corporation

Signed and Sealed this

Fourteenth Day of June, 2011

David J. Kappos
*Director of the United States Patent and Trademark Office*